(12) United States Patent
Katayama et al.

(10) Patent No.: US 8,184,076 B2
(45) Date of Patent: May 22, 2012

(54) METHOD FOR DRIVING LIQUID CRYSTAL DISPLAY DEVICE AND LIQUID CRYSTAL DISPLAY DEVICE

(75) Inventors: Takashi Katayama, Osaka (JP); Masahiro Shimizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 263 days.

(21) Appl. No.: 12/673,449

(22) PCT Filed: Aug. 12, 2008

(86) PCT No.: PCT/JP2008/064480
§ 371 (c)(1),
(2), (4) Date: Feb. 12, 2010

(87) PCT Pub. No.: WO2009/031391
PCT Pub. Date: Mar. 12, 2009

(65) Prior Publication Data
US 2011/0199362 A1 Aug. 18, 2011

(30) Foreign Application Priority Data
Sep. 7, 2007 (JP) ................................ 2007-233422

(51) Int. Cl.
*G09G 3/36* (2006.01)
(52) U.S. Cl. ........................................ 345/87; 345/100
(58) Field of Classification Search ............. 345/87–100
See application file for complete search history.

(56) References Cited

U.S. PATENT DOCUMENTS

| 6,069,620 A | 5/2000 | Nakamura et al. |
| 2001/0005247 A1 | 6/2001 | Kikkawa |
| 2002/0105613 A1 | 8/2002 | Yamakita et al. |
| 2002/0145579 A1 | 10/2002 | Yamakita et al. |
| 2002/0149551 A1 | 10/2002 | Yamakita et al. |
| 2003/0090449 A1 | 5/2003 | Arimoto et al. |
| 2003/0122767 A1 | 7/2003 | Nakao et al. |
| 2005/0062705 A1 | 3/2005 | Yamada |
| 2006/0007084 A1 | 1/2006 | Takeoka et al. |
| 2006/0077157 A1 | 4/2006 | Arimoto et al. |
| 2007/0229447 A1 | 10/2007 | Takahara et al. |

FOREIGN PATENT DOCUMENTS

| CN | 1677475 A | 10/2005 |
| JP | 9-185037 | 7/1997 |
| JP | 2001-183666 | 7/2001 |

(Continued)

OTHER PUBLICATIONS

U.S. Appl. 12/673,053, filed Feb. 11, 2010, entitled "Method of Driving Liquid Crystal Display Device, and Liquid Crystal Display Device".

(Continued)

*Primary Examiner* — Ricardo L Osorio
(74) *Attorney, Agent, or Firm* — Nixon & Vanderhye, P.C.

(57) ABSTRACT

In a method of driving a liquid crystal display device in accordance with the present invention, a transition voltage (+25 VDC) for causing liquid crystal molecules to be in a bend orientation state is applied, and after an entire surface is changed into the bend orientation state, the voltage applied to a liquid crystal layer is continuously reduced from a transition voltage to a reverse tilt eliminating voltage.

7 Claims, 9 Drawing Sheets

FOREIGN PATENT DOCUMENTS

| | | |
|---|---|---|
| JP | 2002-278524 | 9/2002 |
| JP | 2002-328654 | 11/2002 |
| JP | 2003-121881 | 4/2003 |
| JP | 2003-186019 | 7/2003 |
| JP | 2003-295156 | 10/2003 |
| JP | 2005-99212 | 4/2005 |
| JP | 2005-316459 | 11/2005 |
| JP | 2007-256793 | 10/2007 |
| JP | 2007-304560 | 11/2007 |
| TW | 538282 | 6/2003 |

OTHER PUBLICATIONS

U.S. Appl. 12/673,439, filed Feb. 12, 2010, entitled "Liquid Crystal Display Device Driving Method and Liquid Crystal Display Device".

Chinese Office Action and English translation thereof mailed Mar. 29, 2011 in Chinese application 200880102421.8.

International Search Report for PCT/JP2008/064478, mailed Nov. 25, 2008.

U.S. Restriction Requirement mailed Apr. 6, 2012 in U.S. Appl. No. 12/673,439.

METHOD FOR DRIVING LIQUID CRYSTAL DISPLAY DEVICE AND LIQUID CRYSTAL DISPLAY DEVICE

This application is the U.S. national phase of International Application No. PCT/JP2008/064480 filed 12 Aug. 2008, which designated the U.S. and claims priority to JP Application No. 2007-233422 filed 7 Sep. 2007; the entire contents of each of which are hereby incorporated by reference.

TECHNICAL FIELD

The present invention relates to an OCB (Optically Self-Compensated Birefringence) mode liquid crystal display device.

BACKGROUND ART

Conventionally, a liquid crystal display device has been used in a variety of electronic devices such as a television set, a laptop computer, a desktop personal computer, a PDA (personal digital assistant), and a mobile phone. The liquid crystal display device has the advantages that it (i) is thinner and lighter than a CRT (Cathode Ray Tube) display device and (ii) consumes less electric power than the CRT (Cathode Ray Tube) display device because the liquid crystal display device can be driven by a lower voltage than the CRT (Cathode Ray Tube) display device.

Particularly, a liquid crystal display device employing TFT (Thin Film Transistor) elements (such a liquid crystal display device is called a TFT liquid crystal display device) achieves high display quality, because all pixels are switched over via respective TFT elements.

Meanwhile, it has become rapidly widespread in an electronic device such as a television receiver that a moving image is displayed by such a liquid crystal display device. Accordingly, the liquid crystal display device has been required to further increase a response speed of a liquid crystal display panel so as to achieve a moving image with higher quality.

In view of the circumstances, it is an OCB mode liquid crystal display device that has particularly attracted attention recently. The OCB mode liquid crystal display device (OCB panel) is generally configured such that: a liquid crystal layer is provided between two substrates which have been subjected to an alignment treatment so as to cause liquid crystal molecules to be aligned in a same direction in parallel with one another; wave plates are provided on surfaces of the respective two substrates; and polarization plates are further provided on the respective wave plates so that the polarization plates are in a crossed Nicols relation.

(Reverse Transition)

In a case where the OCB panel is employed in a normally white mode (NW mode), in which a black display is carried out while a high voltage is being applied and a white display is carried out while a low voltage is being applied, a voltage applied to the liquid crystal layer needs to be reduced to nearly a critical voltage (Vcr) between spray and bend orientations so that a white display is achieved with high transmittance.

Because of this, a bend-spray transition (reverse transition) sometimes occurred while the white display was being carried out, which allowed a display to be no longer properly carried out. Note that the bend-spray transition here means a phenomenon of the liquid crystal molecules, which once have been in a bend orientation state, again returning into a spray alignment state.

(High White Voltage)

In order to prevent the reverse transition, there has been proposed a variety of methods. One of the methods is a method of increasing a voltage, which is applied to the liquid crystal layer while the white display is being carried out in the normally white mode (such a voltage is called a white voltage), to a voltage sufficiently higher than the critical voltage (Vcr).

Figure 9:
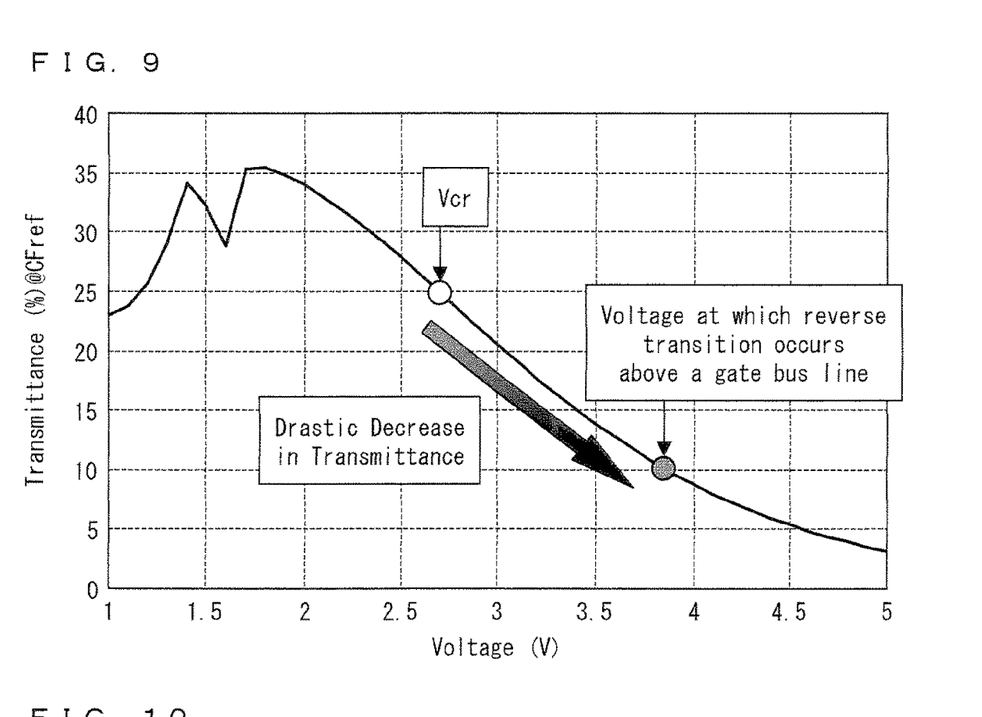
FIG. 9 is a graph illustrating a relation between a voltage to be applied and transmittance in an OCB mode liquid crystal display device (normally white mode).

However, with this method of increasing the white voltage, it was difficult to achieve an OCB panel with high brightness, because of trade-off between the white voltage and brightness (see FIG. 9).

FIG. 9 is a graph showing a relationship between a voltage applied and transmittance in an OCB mode liquid crystal display device which is a normally white mode. Here, the word Vcr denotes the critical voltage between spray and bend orientations.

(Black Insertion)

There has been proposed, as another method for preventing the reverse transition, a method in which a signal is applied separately from an image signal so as to prevent a reverse transition (refer to Patent Literature 1).

Specifically, for example, there has been proposed a method of stably maintaining a bend orientation by inserting a black display once or more times per frame of each display image.

CITATION LIST

Patent Literature 1

Japanese Patent Application Publication, Tokukai, No. 2002-328654 A (Publication Date: Nov. 15, 2002)

SUMMARY OF INVENTION

Display Quality

However, according to the method of inserting the black display, the brightness (white brightness) of the white display decreases and/or flicker occurs. This caused a problem of a decrease in display quality.

(Low Temperature)

Further, in a case where the liquid crystal display device operates at a notably low ambient temperature, the response speed of liquid crystal significantly decreases. Therefore, even if the black display is inserted into each frame, it is still difficult to completely reset the bend orientation. This caused a problem that it was not possible to completely prevent the reverse transition.

(Gate Bus Line)

Furthermore, in a case where the liquid crystal display device is a TFT liquid crystal display device, there has been a problem that the reverse transition is likely to occur above a gate bus line, which is a wire connected to a corresponding one of TFTs.

This is described below with reference to (*a*) and (*b*) of FIG. 10.

Figure 10:
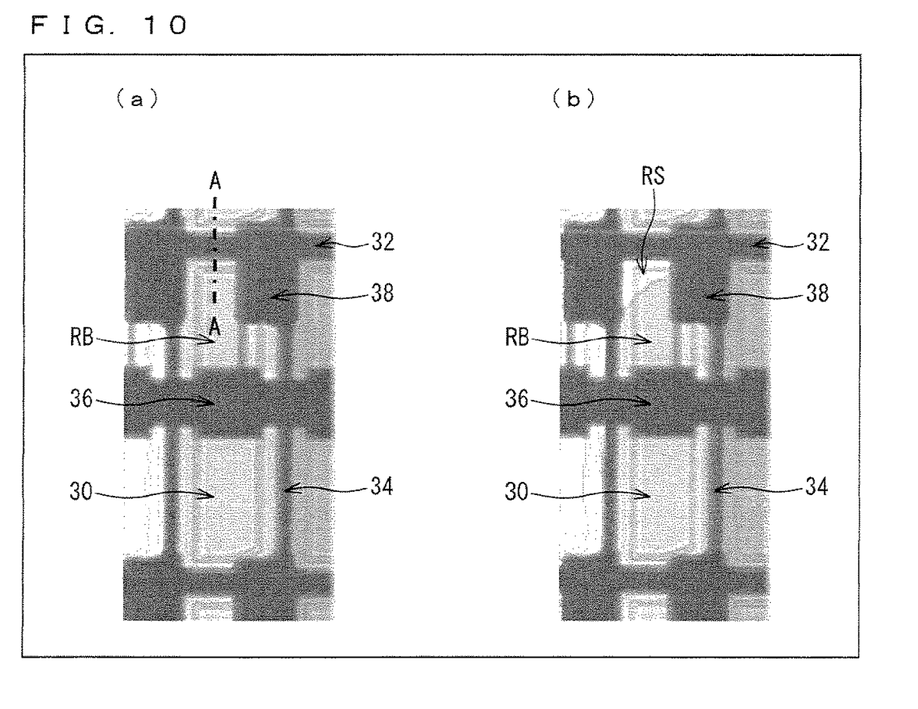
FIG. 10 shows diagrams illustrating an orientation state of liquid crystal molecules. (*a*) of FIG. 10 illustrates an orientation state of the liquid crystal molecules in a pixel in which no reverse transition occurs above a gate bus line. (*b*) of FIG. 10 illustrates an orientation state of liquid crystal molecules in a pixel in which a reverse transition occurs above a gate bus line.

(*a*) of FIG. 10 illustrates an orientation state of liquid crystal molecules in a pixel in which no reverse transition occurs above a gate bus line. (*b*) of FIG. 10 illustrates an orientation state of the liquid crystal molecules in a pixel in which a reverse transition occurs above a gate bus line.

As illustrated in (*a*) and (*b*) of FIG. 10, each pixel 30 in the TFT liquid crystal display device includes a TFT element 38, to which a corresponding gate bus line 32 and a corresponding source bus line 34 are connected. Further, a corresponding storage capacitor line 36 is provided in the vicinity of a center part of the pixel 30.

The liquid crystal molecules above the gate bus line 32 are in the bend orientation state while the spray-bend transition voltage is being applied. Here, as illustrated in (a) of FIG. 10, the liquid crystal molecules in the pixel 30 are in a uniform bend orientation state (see the region RB (a bend orientation region) of (a) of FIG. 10).

However, after the transition voltage is no longer applied, the liquid crystal molecules above the gate bus line 32 and the liquid crystal molecules in regions along the gate bus line 32 easily return into the spray orientation state (this phenomenon is called a reverse transition occurring above the gate bus lines 32).

Then, the spray orientation that began above the gate bus lines 32 spreads into the pixel 30 (see the region RS (a spray orientation region) of (b) of FIG. 10), thereby ultimately causing a display defect.

The reverse transition occurring above the gate bus line 32 occurred even while a voltage that is equal to or higher than the voltage Vcr (see FIG. 9) was being applied, and was difficult to prevent.

In view of the circumstances, the present invention has been made in view of the problems, and an object of the present invention is to achieve a method of driving a liquid crystal display device and a liquid crystal display device which are capable of preventing the reverse transition while preventing a decrease in display quality (such as a decrease in white brightness and/or occurrence of flicker).

Further, another object of the present invention is to achieve (i) a method of driving, in particular, an active matrix liquid crystal display device and (ii) an active matrix liquid crystal display device which are capable of achieving a display with high brightness by preventing the reverse transition occurring above a bus line such as a gate bus line.

In order to attain the above objects, a method of driving an OCB mode liquid crystal display device in accordance with the present invention, the OCB mode liquid crystal display device including: a main substrate on which pixel electrodes are provided; a counter substrate on which a common electrode is provided; and a liquid crystal layer sandwiched between the main substrate and the counter substrate, the liquid crystal layer containing liquid crystal molecules which are in a spray orientation state while no voltage is applied to the liquid crystal layer, and a transition of the liquid crystal molecules occurring from the spray orientation state into a bend orientation state in response to a voltage applied to the liquid crystal layer, said method including the steps of: (i) applying, to the liquid crystal layer, a transition voltage causing the transition of the liquid crystal molecules into the bend orientation state; and (ii) continuously reducing the voltage to be applied to the liquid crystal layer from the transition voltage to a reverse tilt eliminating voltage, the reverse tilt eliminating voltage causing the liquid crystal molecules, which exist in an edge part of each of the pixel electrodes and which are tilted in a reverse tilt direction while the transition voltage is being applied, to be tilted in a forward tilt direction, the forward tilt direction being a direction in which the liquid crystal molecules are tilted while no voltage is applied, and the reverse tilt direction being a direction reverse to the forward tilt direction.

According to this arrangement, the liquid crystal molecules, whose tilt direction is different from the others, are prevented from existing. That is, the liquid crystal molecules that are tilted in a direction reverse to the forward tilt direction (proper tilt direction), i.e., reversely-tilted liquid crystal molecules, are prevented from remaining. This is one of two conditions to be satisfied for the reverse transition to occur, which two conditions are: the above-described condition (1) and another condition (2) in which a lateral electrical field exists at time when the transition voltage is turned off. Accordingly, the reverse transition is not likely to occur.

Moreover, in this arrangement, it is necessary to neither change a drive voltage to be applied while an actual display is being carried out (the above-described high white voltage or the like) nor apply a signal separately from the image signal so as to prevent the reverse transition phenomenon while the actual display is being carried out (the above-described black insertion or the like).

Therefore, the method of driving the liquid crystal display device in accordance with the present invention makes it possible to prevent the reverse transition while preventing a decrease in display quality (such as a decrease in white brightness, and/or occurrence of flicker).

Further, the method of driving the liquid crystal display device in accordance with the present invention is not a method in which the signal other than the image signal, which signal prevents the reverse transition phenomenon, is inserted into each interval of image signals. Therefore, for example even in a case where a liquid crystal display device operates at a notably low ambient temperature and a response speed of the liquid crystal molecules is low, it is still possible to prevent the reverse transition.

The method of driving the liquid crystal display device in accordance with the present invention may be arranged such that the pixel electrodes are provided in a lattice pattern on the main substrate, a switching element is provided for each of the pixel electrodes, the switching element is a transistor element, a plurality of gate bus lines and a plurality of source bus lines are provided on the main substrate so as to intersect with each other, the transistor element is connected to at least one of the plurality of gate bus lines and to at least one of the plurality of source bus lines, at least one of the plurality of the gate bus lines or at least one of the plurality of the source bus lines is provided between adjacent ones of the pixel electrodes, and the pixel electrodes that are provided in the lattice pattern are inversely driven.

In the liquid crystal display device thus arranged, a corresponding one of bus lines such as a corresponding one of the gate bus lines is provided between the adjacent ones of the pixel electrodes. Further, since the pixel electrodes that are provided in the lattice pattern (in a matrix manner) are driven by a line inversion driving, a dot inversion driving, or the like, the lateral electrical field is likely to be generated between the adjacent ones of the pixel electrodes.

The reverse transition is likely to occur in the vicinities of the bus lines; however, the reverse tilt which triggers the reverse transition is prevented from remaining. As such, the reverse transition is prevented.

Accordingly, the method of driving the liquid crystal display device in accordance with the present invention makes it possible to prevent the reverse transition occurring above the bus line such as the gate bus line from occurring in an active matrix type liquid crystal display device.

Particularly, it is possible to more surely prevent the reverse transition that occurs at a voltage equal to or higher than the voltage Vcr (a spray-bend critical voltage), thereby making it possible to easily achieve a display with high brightness.

The method of driving the liquid crystal display device in accordance with the present invention is preferably arranged such that the voltage to be applied to the liquid crystal layer is continuously reduced, at a speed equal to or lower than a speed at which the liquid crystal molecules respond, from the transition voltage to the reverse tilt eliminating voltage.

According to this arrangement, the voltage to be applied to the liquid crystal layer is reduced, over a sufficient period of time, from the transition voltage to a voltage at which a tilt direction of the liquid crystal molecules is changed from the reverse tilt direction into the forward tilt direction, at the speed equal to or lower than the speed at which the liquid crystal molecules respond. This makes it possible to more surely change the tilt direction of the liquid crystal molecules from the reverse tilt direction into the forward tilt direction.

As such, it is possible to more surely prevent the reverse transition.

The method of driving the liquid crystal display device in accordance with the present invention is preferably arranged such that: in at least the step (i), a period is secured during which no electric potential difference occurs between adjacent ones of the pixel electrodes between which a corresponding one of the plurality of gate bus lines is provided by simultaneously causing all of the plurality of gate bus lines to be in an ON state so that voltages of identical polarity are applied to the respective adjacent ones of the pixel electrodes.

According to this arrangement, while the transition voltage is being applied to the liquid crystal layer and the transition of the liquid crystal molecules from the spray orientation state into the bend orientation state is occurring, at least one of the pixel electrodes adjacent to a first pixel electrode has the same potential as that of the first pixel electrode. Note that no lateral electrical field is generated between the pixel electrodes having the identical electric potential.

Accordingly, the bend orientation occurred in the first pixel is likely to spread therefrom into pixels adjacent to the first pixel. This is particularly effective in a case where the liquid crystal molecules have positive dielectric anisotropy.

As described above, the method, of driving the liquid crystal display device in accordance with the present invention arranged as such provides an effect that it is possible to prevent a decrease in display quality and occurrence of the reverse transition, and further to carry out a spray-bend transition over an entire display surface in a short time while preventing the decrease in display quality and the occurrence of the reverse transition.

The method of driving the liquid crystal display in accordance with the present invention may be arranged such that the reverse tilt eliminating voltage is 0 V or higher and 15 V or lower. The method of driving the liquid crystal display device in accordance with the present invention may be arranged such that the reverse tilt eliminating voltage is not higher than a pixel electrode electric potential.

According to these arrangements, it is possible to more surely change the tilt direction of the liquid crystal molecules from the reverse tilt direction into the forward tilt direction.

A liquid crystal display device of the present invention is preferably driven by the method as described above.

According to this arrangement, it is possible to achieve a liquid crystal display device in which the reverse transition is not likely to occur.

As so far described, the method of driving the liquid crystal display device and the liquid crystal device of the present invention include the steps of: (i) applying, to the liquid crystal layer, a transition voltage causing the transition of the liquid crystal molecules into the bend orientation state; and (ii) continuously reducing the voltage to be applied to the liquid crystal layer from the transition voltage to a reverse tilt eliminating voltage, the reverse tilt eliminating voltage causing the liquid crystal molecules, which exist in an edge part of each of the pixel electrodes and which are tilted in a reverse tilt direction while the transition voltage is being applied, to be tilted in a forward tilt direction, the forward tilt direction being a direction in which the liquid crystal molecules are tilted while no voltage is applied, and the reverse tilt direction being a direction reverse to the forward tilt direction.

As such, it is possible to achieve a method of driving a liquid crystal display device and a liquid crystal display device that are capable of preventing an occurrence of the reverse transition while preventing a decrease in display quality.

EXPLANATION OF REFERENTIAL NUMERALS

1 Liquid Crystal Display Device
5 Liquid Crystal Display Panel
10 First Substrate (Main Substrate)
11 First Glass Substrate
13 Wiring Layer
15 Insulating Layer
17 Pixel Electrode
17*a* First Pixel Electrode
17*b* Second Pixel Electrode
19 First Alignment Film
20 Second Substrate (Counter Substrate)
21 Second Glass Substrate
23 Color Filter
27 Common Electrode
29 Second Alignment Film
30 Pixel
32 Gate Bus Line
34 Source Bus Line 36 Storage Capacitor Line
38 TFT element
41 First Optical Compensation Film
43 First Polarization Plate
45 Second Optical Compensation Film
47 Second Polarization Plate
50 Liquid Crystal Layer
52 Liquid Crystal Molecule
60 Display Control Circuit
62 Gate Driver
64 Source Driver
66 Gray Scale Voltage Generator
68 Power Supply for Driving Common Electrode
70 Backlight
RN Forward Tilt Region
RR Reverse Tilt Region
RB Bend Orientation Region
RS Spray Orientation Region
Vcr Spray-Bend Critical Voltage

DESCRIPTION OF EMBODIMENTS

One embodiment of the present invention is described below with reference to FIGS. 1 through 10.

(Brief Summary of Structure of Liquid Crystal Display Device)

First, a structure of a liquid crystal display device 1 is described with reference to FIG. 1, which is a block diagram schematically illustrating an overall structure of the liquid crystal display device 1.

Figure 1:
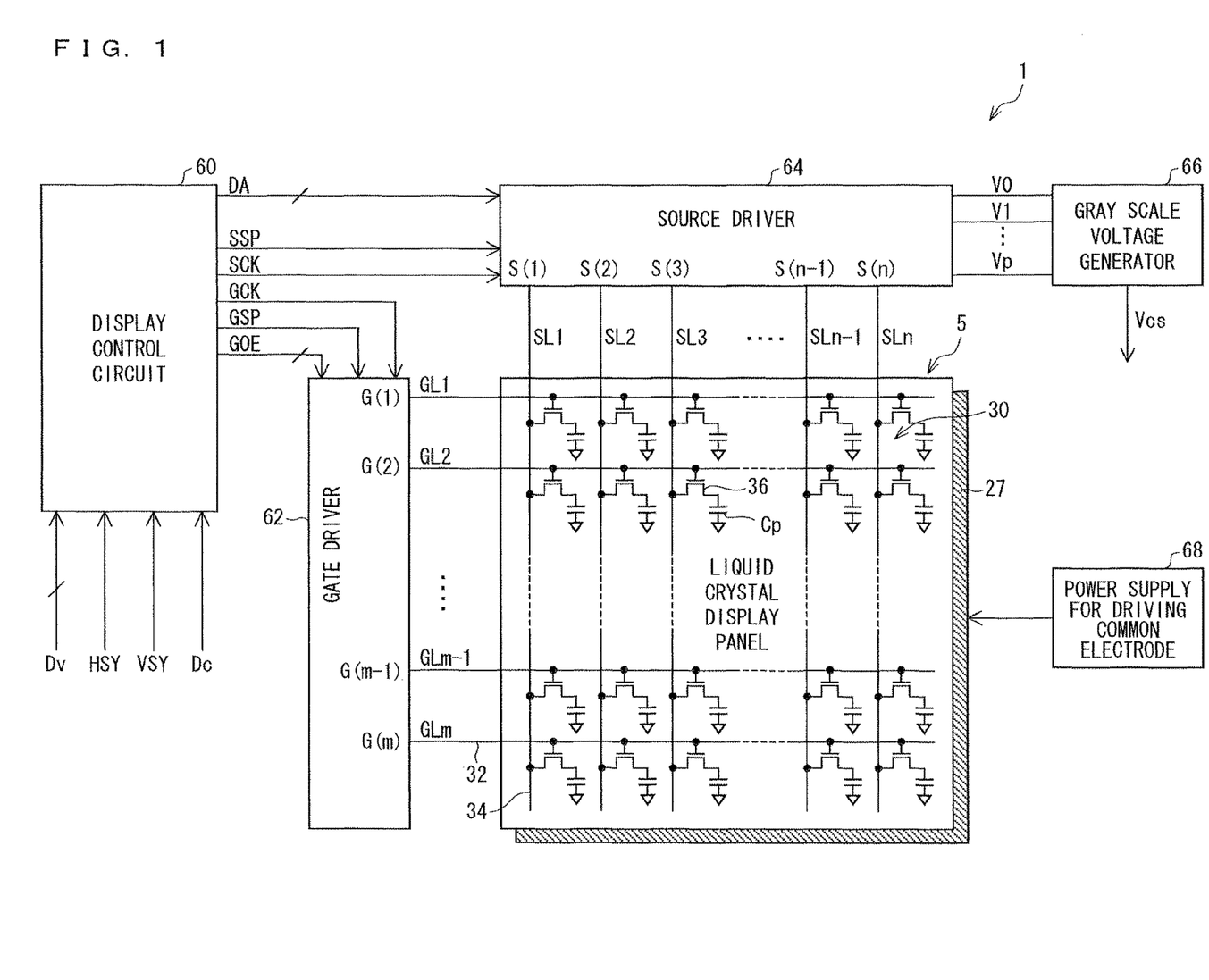
FIG. 1, showing an embodiment of the present invention, is a block diagram schematically illustrating a structure of a liquid crystal display device.

As illustrated in FIG. 1, the liquid crystal display device 1 of the present embodiment includes: a gate driver 62 serving as a scanning signal line driving circuit; a source driver 64 serving as a data signal line driving circuit; a display control circuit 60 which controls the gate driver 62 and the source driver 64; a gray scale voltage generator 66; a power supply for driving common electrode 68 for driving a common electrode 27; and an active matrix (TFT) liquid crystal display panel 5.

The liquid crystal display panel 5 in the liquid crystal display device 1 includes: gate bus lines 32 (GL1 through GLm) serving as a plurality of scanning signal lines (m scanning signal lines); source bus lines 34 (SL1 through SLn) serving as a plurality of data signal lines (n data signal lines) which intersect with the gate bus lines 32 (GL1 through GLm); and a plurality of pixels 30 (m×n pixels) which are provided so as to correspond to respective intersections of the gate bus lines 32 (GL1 through GLm) and the source bus lines 34 (SL1 through SLn).

The plurality of pixels 30 are arranged in a matrix manner so as to form a pixel array, and each of the plurality of pixels 30 includes: a TFT element 38 serving as a switching element; a pixel electrode (not illustrated) that is connected to a drain terminal of the TFT element 38; and a capacitor electrode (not illustrated) that is shared by the plurality of pixels 30.

The TFT element 38, serving as the switching element, includes: a gate terminal connected to a gate bus line 32 that passes through a corresponding one of the intersections; and a source terminal connected to a source bus line 34 that passes through the corresponding one of the intersections.

Moreover, a pixel capacitance Cp is made up of (i) a liquid crystal capacitance defined by a pixel electrode 17 and the common electrode 27 and (ii) a storage capacitance defined by the pixel electrode 17 and a capacitor electrode (storage capacitor line).

The storage capacitor is provided in parallel with the liquid crystal capacitance so that the pixel capacitance surely retains a voltage. Note however that the storage capacitor is not necessarily provided, and therefore may be omitted.

(Brief Summary of Driving)

Next, the following describes how the liquid crystal display device 1 is driven.

A pixel electrode 17 in a corresponding one of the plurality of pixels 30 is given, by the gate driver 62 and the source driver 64, an electric potential which varies depending on an image to be displayed. This causes a voltage, which varies depending on an electric potential difference between the pixel electrode 17 and the common electrode 27, to be applied to a liquid crystal layer 50 (liquid crystal molecules 52). In response to such a voltage, light transmittance of the liquid crystal layer 50 is controlled. In this way, the image is displayed.

More specifically, during a normal driving in which an image or the like is displayed on the liquid crystal panel 5, the gate driver 62 sequentially selects the gate bus lines GL1 through GLm for substantially one horizontal scanning period per gate bus line in each of frame periods (each of vertical scanning periods), and then the source driver 64 writes the data signals S(1) through S(n) into the pixels 30 corresponding to the gate bus line thus selected (this is called a line-sequential driving). During this, for example, the common electrode 27 receives a rectangular wave corresponding to the selection made by a corresponding gate bus line 32. This causes an inversion driving such as a line inversion driving to be carried out.

Note in FIG. 1 that DA denotes a digital image signal, SSP denotes a source start pulse signal, SCK denotes a source clock signal, GCK denotes a gate clock signal, GSP denotes a gate start pulse signal, GOE denotes a gate driver output control signal, Dv denotes a digital video signal, HSY denotes a horizontal synchronization signal, VSY denotes a vertical synchronization signal, Dc denotes a control signal, and Vcs denotes a voltage applied to a capacitor electrode.

(Structure of Liquid Crystal Display Panel)

Figure 2:
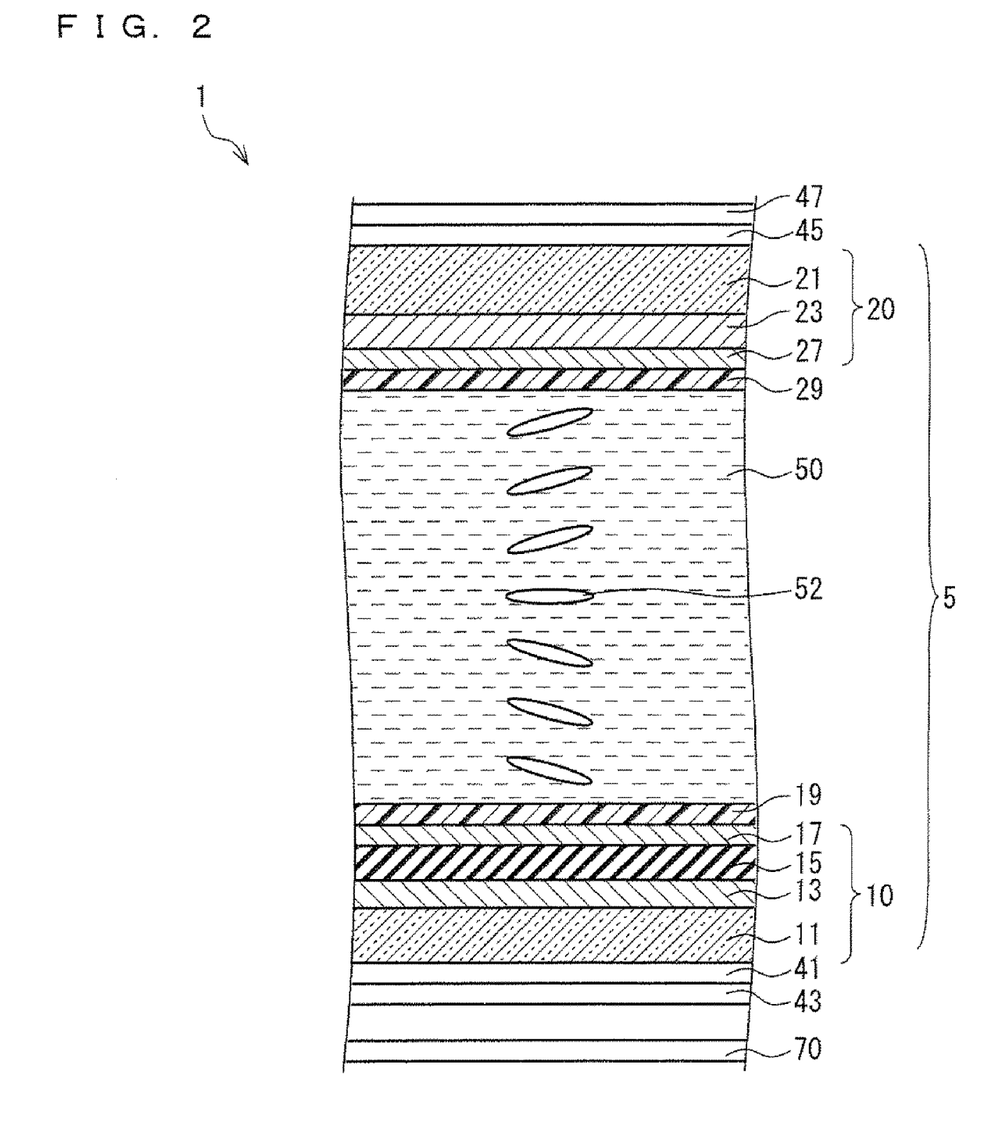
FIG. 2 is a cross-sectional view schematically illustrating a structure of an OCB mode liquid crystal display device.
Figure 3:
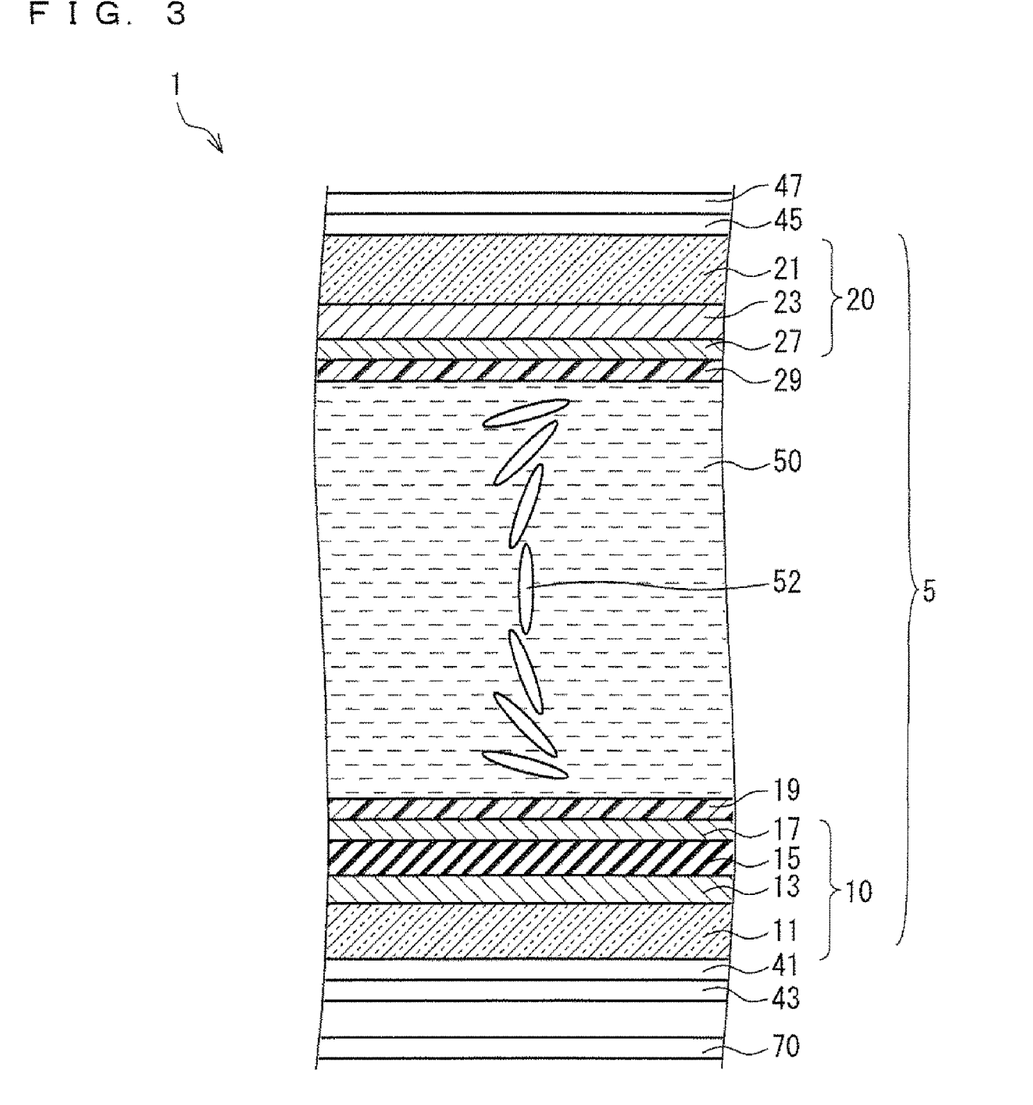
FIG. 3 is another cross-sectional view schematically illustrating the structure of the OCB mode liquid crystal display device.

Next, a structure of the liquid crystal display panel 5, which constitutes a main part of the liquid crystal display device 1, is described with reference to FIGS. 2 and 3. FIGS. 2 and 3 are cross-sectional views schematically illustrating a structure of an OCB mode liquid crystal display device.

An OCB mode liquid crystal display panel 5 is configured such that: the liquid crystal molecules 52 are provided between two substrates (a first substrate 10 and a second substrate 20) which have been subjected to an alignment treatment so as to cause the liquid crystal molecules 52 to be aligned in a same direction in parallel with one another; wave plates (a first optical compensation film 41 and a second optical compensation film 45) are provided on surfaces of the first substrate 10 and the second substrate 20; and polarization plates (a first polarization plate 43 and a second polarization plate 47) are further provided on the wave plates of the first substrate 10 and the second substrate 20 so that the polarization plates are in a crossed Nicols relation.

More specifically, the liquid crystal display panel 5 includes (i) the first substrate 10 serving as a TFT substrate (an active matrix substrate, i.e., a main substrate) that includes TFT (Thin Film Transistor) elements 36 and is constituted by a first glass substrate 11 on which a wiring layer 13, an insulating layer 15, the pixel electrodes 17, and a first alignment film 19 are provided and (ii) the second substrate 20 serving as a counter substrate that is constituted by a second glass substrate 21 on which a color filter 23, the common electrode 27, and a second alignment film 29 are provided. The liquid crystal layer 50 containing the liquid crystal molecules 52 is sandwiched between the first substrate 10 and the second substrate 20.

Further, the first optical compensation film (wave plate) 41 and the first polarization plate 43 are provided on a surface of the first glass substrate 11, which surface is opposite to the surface on which the wiring layer 13 is provided. On the other hand, the second optical compensation film (wave plate) 45 and the second polarization plate 47 are provided on a surface of the second glass substrate 21, which surface is opposite to the surface on which the color filter 23 is provided.

For example, a negative wave plate whose major axis is hybrid-aligned is used as the wave plate (the first optical compensation film 41 and the second optical compensation film 45).

Further, a backlight 70 is provided on a backside surface side of the liquid crystal display panel 5.

More specifically, the first alignment film 19 and the second alignment film 29 have been subjected to an alignment treatment by rubbing (rubbing alignment treatment). As described later, this alignment treatment is carried out by rubbing, in an identical direction, surfaces of two substrates facing each other (the TFT substrate and the counter substrate). This causes (i) the liquid crystal molecules 52 to be in a spray orientation state while no voltage is applied and (ii) the liquid crystal molecules 52 to be in a bend alignment state while a voltage is being applied.

The first glass substrate 11 and the second glass substrate 21 are combined via spherical spacers or columnar spacers (not illustrated).

The liquid crystal molecules 52 which are provided between the two glass substrates and constitute the liquid crystal layer 50 have positive dielectric anisotropy. As used herein, the liquid crystal molecules 52 which have the positive dielectric anisotropy intend to the ones that have a characteristic in which they are oriented so that their longitudinal axes are in parallel with an electrical field while a voltage is being applied to the liquid crystal molecules 52.

Further, the polarization plates attached to respective surfaces of the first substrate 10 and the second substrate 20, i.e., the first polarization plate 43 and the second polarization plate 47 are provided so that (i) a transmission axis of the first polarization plate 43 is at an angle of 45 degrees (i.e., a crossed Nicols relation) with respect to an alignment direction in which the liquid crystal molecules 52 on the first polarization plate 43 are aligned (i.e., with respect to a direction in which the rubbing alignment treatment is carried out) and (ii) a transmission axis of the second polarization plate 47 is at an angle of 135 degrees (i.e., a crossed Nicols relation) with respect to an alignment direction in which the liquid crystal molecules 52 on the second polarization plate 47 are aligned (i.e., with respect to the direction in which the rubbing alignment treatment is carried out).

(Structure of Pixel)

Next, a structure of each of the pixels 30 in the liquid crystal display panel 5 of the present embodiment is described with reference to (a) of FIG. 10.

(a) of FIG. 10 is a diagram illustrating an alignment state of liquid crystal molecules in each of the pixels 30. As illustrated in (a) of FIG. 10, a TFT element 38 is provided for each of the pixels 30 of the present embodiment. The TFT element 38 is connected with a corresponding one of the gate bus lines 32 and a corresponding one of the source bus lines 34. Each of the pixels 30 is surrounded by corresponding adjacent ones of the gate bus lines 32 and corresponding adjacent ones of the source bus lines 34.

Further, a corresponding storage capacitor line 36 is provided in the vicinity of a center part of each of the pixels 30.

The gate bus lines 32 and the source bus lines 34 are connected to the gate driver 62 and the source driver 64, respectively.

(Orientation of Liquid Crystal Molecules)

Next, an orientation of the liquid crystal molecules in the OCB mode liquid crystal display device is described with reference to FIGS. 2 and 3.

As described above, FIGS. 2 and 3 are cross-sectional views schematically illustrating a structure of an OCB mode liquid crystal display device 1. FIG. 2 illustrates an orientation state of the liquid crystal molecules 52 while no voltage is applied. FIG. 3 illustrates an orientation state of the liquid crystal molecules 52 while a voltage is being applied.

According to the OCB mode liquid crystal display device 1, the liquid crystal molecules 52 are in a spray orientation state while no voltage is applied (see FIG. 2). While a voltage is being applied, a transition (a spray-bend transition) of the liquid crystal molecules 52 from the spray orientation state into a bend orientation state occurs as illustrated in FIG. 3. A display is carried out by changing a tilting angle of each of the liquid crystal molecules 52 during the bend orientation state.

More specifically, as illustrated in FIG. 2, the liquid crystal molecules 52 that have just been injected are in the spray orientation state (initial orientation state), in which each of the liquid crystal molecules 52 is in substantially parallel with the first substrate 10. The transition of the liquid crystal molecules 52 that are in the spray orientation state into the bend orientation state generally occurs in response to a voltage applied to the liquid crystal molecules 52. Specifically, while a relatively high voltage (a transition voltage), e.g., 25 V, is being applied to the liquid crystal molecules 52 that are in the spray orientation state, a transition occurs from a spray orientation state into a bend orientation state, and then the liquid crystal molecules 52 in a display surface are sequentially changed into the bend orientation state (see FIG. 3).

Meanwhile, as described earlier, the OCB mode liquid crystal display device 1 carries out an actual display while the liquid crystal molecules 52 are being in the bend orientation state. Therefore, the spray-bend transition must be carried out every time the liquid crystal display device 1 is powered on.

Then, after completion of the spray-bend transition, application of the transition voltage is stopped so that a normal driving is carried out.

(Actual Display)

As described above, the actual display is carried out after completion of the spray-bend transition, that is, the actual display is carried out while the liquid crystal molecules 52 are being in the bend orientation state. Specifically, the actual display is carried out as described below.

That is, while an on-voltage out of voltages for a normal display (display voltage) is being applied to the liquid crystal molecules 52 that are in the bend orientation state, the liquid crystal molecules 52 try to orient in a direction which is more perpendicular to the two substrates, as compared to the liquid crystal molecules 52 to which an off-voltage of the display voltage is being applied. In other words, the liquid crystal molecules 52 try to orient so as to be at an angle with the two substrates, which angle is more perpendicular to the two substrates.

In either case, a white display and a black display are carried out by changing a tilting angle of each of the liquid crystal molecules 52 that are in the bend orientation state. Since the tilting angle changes very rapidly, the OCB mode liquid crystal display device 1 is capable of displaying moving images of good quality.

(Application of Transition Voltage in the Present Embodiment)

In order to prevent a reverse transition from the bend orientation state into the spray orientation state as described earlier, the liquid crystal display device 1 of the present embodiment is arranged such that the voltage applied to the liquid crystal molecules 52 during the spray-bend transition is different from that of the conventional techniques. This is described as follows.

(Mechanism of Occurrence of Reverse Transition)

A mechanism of occurrence of the reverse transition is described by exemplifying a reverse transition attributed to, in especial, the gate bus lines 32.

As described earlier, the liquid crystal molecules 52, above a gate bus line 32 and in a region along the gate bus line 32, are easily subjected to the reverse transition and return into the spray orientation state from the bend orientation state, even while a voltage equal to or higher than the voltage Vcr (a critical voltage between the spray and the bend orientation states) is being applied.

Under these circumstances, in order to prevent the reverse transition occurring above the gate bus lines 32, the inventors first studied a cause of occurrence of the reverse transition.

The study proved that the reverse transition occurring above the gate bus line 32 is likely to occur in a case where the following conditions, that is, condition (1) and condition (2), are both satisfied.

Condition (1): Remaining of Reversely-Tilted Liquid Crystal Molecules

Some of the liquid crystal molecules 52 remain reversely tilted, particularly above the gate bus line 32.

Condition (2): Existence of Lateral Electrical Field at a Time when the Transition Voltage is Turned Off A lateral electrical field exists immediately after the transition voltage is turned off.

The study proved that the reverse transition is likely to occur above the gate bus line 32 in a case where the above two conditions are both satisfied.

This demonstrates that the spray orientation is induced in response to the lateral electrical field applied to the liquid crystal molecules 52 that are reversely tilted, thereby causing the reverse transition to become more likely to occur. This is described below in more detail.

Condition (1): Remaining of Reversely-Tilted Liquid Crystal Molecules

The reversely-tilted liquid crystal molecules 52 intend to the liquid crystal molecules 52 in one part that are tilted up in a direction reverse to that of liquid crystal molecules 52 in the other parts.

Figure 4:
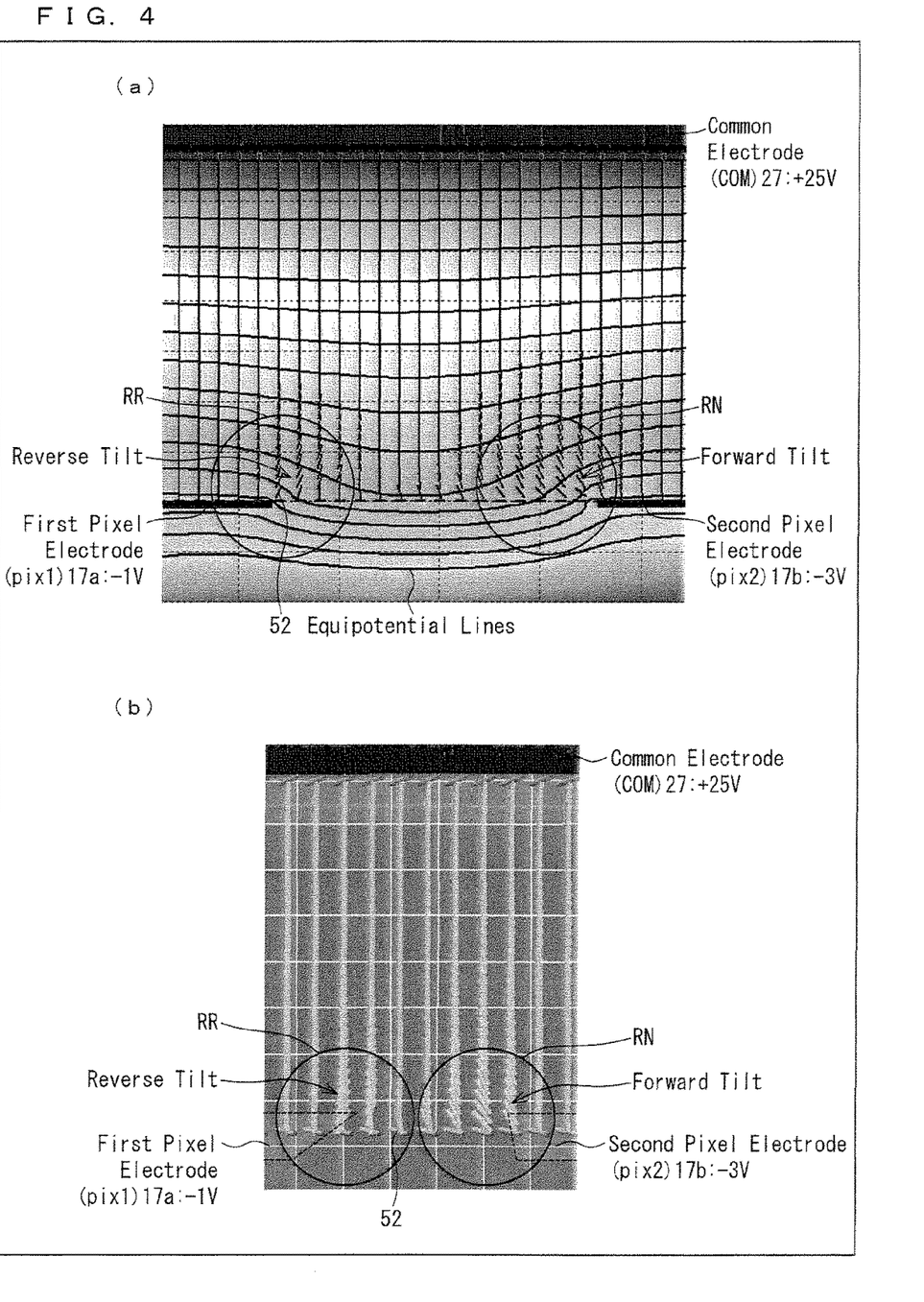
FIG. 4 shows diagrams schematically illustrating an orientation state of liquid crystal molecules while a transition voltage is being applied.

The following description deals with how the liquid crystal molecules orient while the transition voltage is being applied, with reference to (a) and (b) of FIG. 4. (b) of FIG. 4 is an enlarged view of a part of (a) of FIG. 4. (a) of FIG. 4 is a cross-sectional view taken along the line A-A in (a) of FIG. 10.

As is clear from (a) of FIG. 4, a tilt direction of the liquid crystal molecules 52 in a region RR that is in the vicinity of an edge part of a first pixel electrode 17a is different from that in a region RN that is in the vicinity of an edge part of a second pixel electrode 17b.

Out of the tilt directions of the liquid crystal molecules 52 in the region RR and in the RN region, the tilt direction of the liquid crystal molecules 52 in the region RR has been changed (reverse tilt), in response to the applied transition voltage, from a state in which the liquid crystal molecules 52 are tilted before the transition voltage is applied.

In other words, the liquid crystal molecules both in the region RR and in the region RN were tilted in an identical direction (forward tilt direction), before the transition voltage is applied.

The reason why the tilt direction of the liquid crystal molecules 52 in the region RR is different from that in the region RN in response to the applied transition voltage (the reason why the reverse tilt occurs) is that the application of the high voltage causes a distortion of equipotential lines between the first pixel electrode 17a and the second pixel electrode 17b.

As illustrated in (a) of FIG. 4, the equipotential lines are largely distorted in respective directions reverse to each other, and the liquid crystal molecules 52 are twisted in the vicinities of the respective edge parts of the first pixel electrode 17a and the second pixel electrode 17b. Since the equipotential lines extend in reverse directions in the region RR and in the region RN, the tilt direction of the liquid crystal molecules 52 in the region RR is reverse to that in the region RR. As such, the liquid crystal molecules 52 in one of the regions RR and RN are in a forward tilt state, whereas the liquid crystal molecules 52 in the other are in a reverse tilt state.

In a case where the transition voltage applied to the liquid crystal layer 50 is rapidly reduced, the reverse tilt state is not reduced, and therefore the reverse tilt is likely to remain. The following describes how a voltage applied to a common electrode varies, with reference to FIG. 5.

(Voltage Applied)

Conventionally, as illustrated in "TRANSITION VOLTAGE (CONVENTIONAL)" of FIG. 5, a voltage was applied in the following manner. First, a DC voltage (transition voltage) of for example +25 V was applied to a common electrode (COM) so as to trigger the transition from the spray orientation into the bend orientation, and then kept being applied over a period during which the spray orientation was being changed to the bend orientation.

After completion of the transition from the spray orientation state into the bend orientation state, the application of the DC voltage was instantaneously (suddenly) stopped so as to cause a transition into a normal driving such as an inversion driving. In this process, since the application of the DC voltage was suddenly stopped, the voltage applied to the liquid crystal layer 50 rapidly reduced. Accordingly, the reverse tilt state, occurred during the application of the transition voltage, was likely to remain. Especially, the reverse tilt state was likely to occur above a gate bus line 32.

The transition from the spray orientation state into the bend orientation state is more likely to occur as the transition voltage becomes higher. Therefore, the transition voltage to be applied to the COM is preferably higher. Note however that in a case where a higher transition voltage is applied, the distortion of the equipotential lines becomes larger. This causes the liquid crystal molecules 52 to be more twisted. As a result, the liquid crystal molecules 52 were more likely to be tilted up in a direction reverse to a target direction.

Condition (2): Existence of Lateral Electrical Field at a Time when the Transition Voltage is Turned Off Next, the lateral electrical field existing at a time when the transition voltage is turned off is described.

Generally, a TFT liquid crystal display device (an active matrix liquid crystal display device) employs a line inversion driving or a dot inversion driving.

Figure 5:
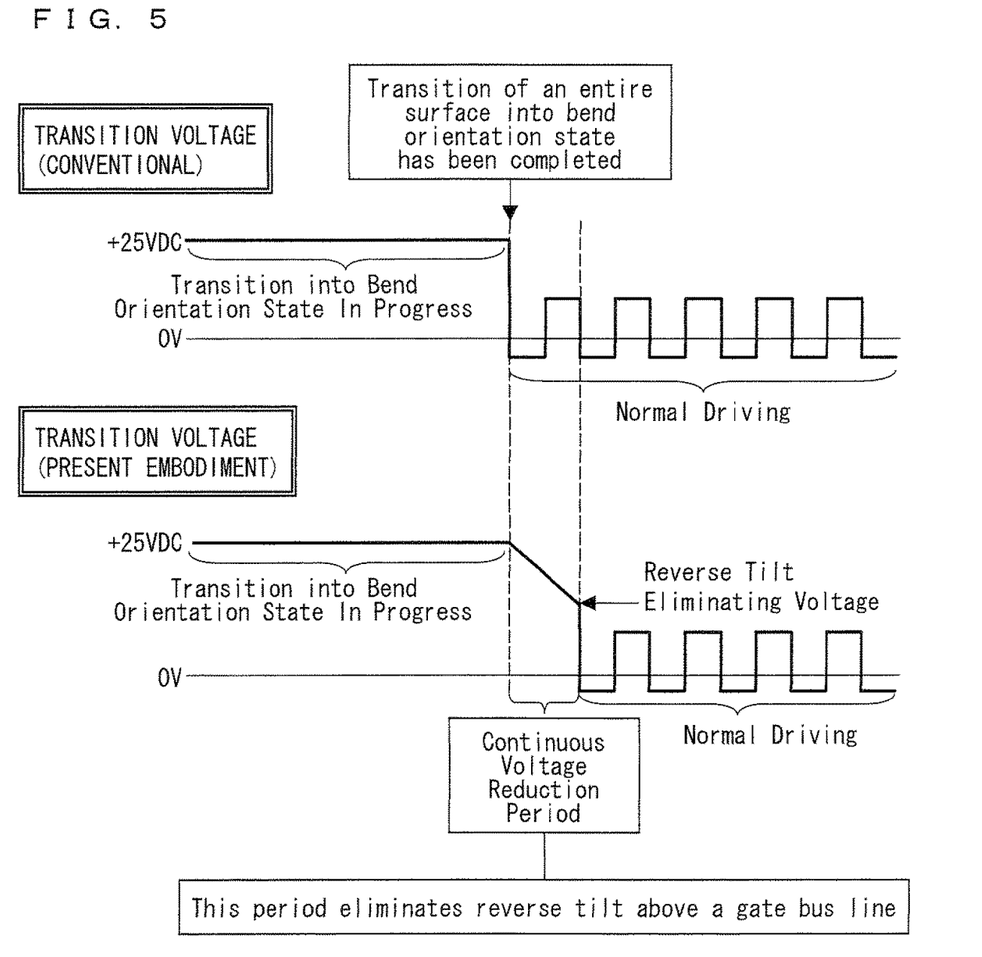
FIG. 5 is a diagram illustrating how a voltage to be applied to a common electrode varies.

Therefore, as illustrated in "Normal Driving" in FIG. 5, different voltages are applied to respective adjacent pixel electrodes 17 between which a corresponding one of the gate bus lines 32 is provided. This causes the lateral electrical field to be generated between the adjacent pixel electrodes 17.

Figure 6:
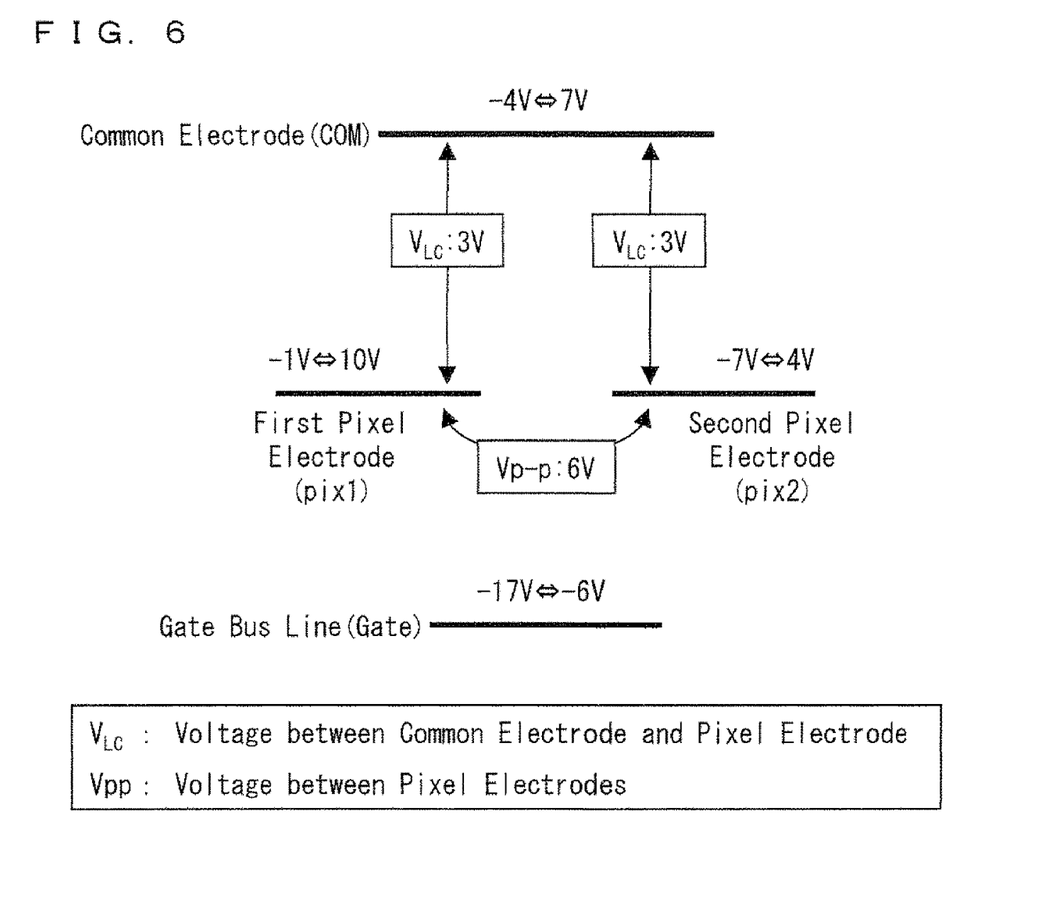
FIG. 6 is a diagram illustrating an electric potential of each of electrodes and a lateral electrical field, while a white display (normal display) is being carried out.

For example, according to an example of FIG. 6, an electric potential of 6 V is generated between the adjacent pixel electrodes 17, while a white display is being carried out.

FIG. 6 is a diagram illustrating the electric potential of each of the electrodes to be applied and the lateral electrical field to be generated, while a white display is being carried out.

Figure 7:
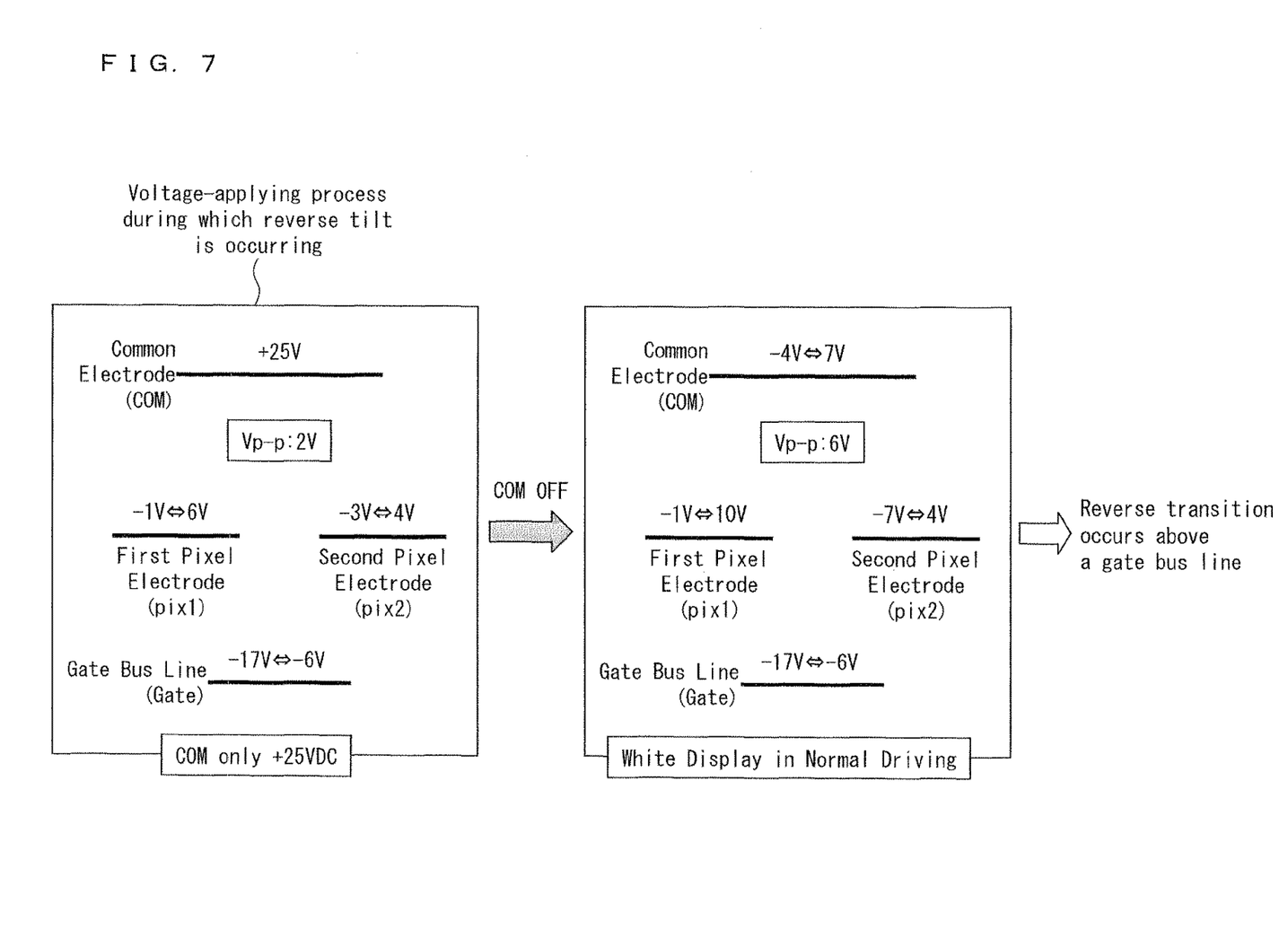
FIG. 7 is a diagram showing a lateral electrical field to be generated during a transition of liquid crystal molecules into a bend orientation state and a lateral electrical field to be generated while a normal driving is being carried out.

In a case where the driving for the white display is carried out by the electric potentials illustrated in FIG. 6 during the normal driving (during the actual display), a change in the lateral electrical field generated when a transition occurs from a bend transition voltage applying period (a transition voltage applying process) into the normal drive period is shown in FIG. 7. FIG. 7 is a diagram showing (i) voltages applied to respective adjacent pixels during a general transition voltage applying-process and (ii) voltages applied to the respective adjacent pixels while the white display is being carried out during the normal driving (while a normal driving is being carried out).

As illustrated in FIG. 7, an electric potential difference between a first pixel electrode (pix 1) and a second pixel electrode (pix 2) is 2 V during the transition voltage-applying process (a period during which the transition voltage is being applied to the common electrode). On the other hand, an electric potential difference between the first pixel electrode (pix 1) and the second pixel electrode (pix 2) is 6 V while the white display is being carried out during the normal driving after application of the transition voltage is stopped, as mentioned earlier.

As is clear from above, when the transition occurs from (a) the process in which the transition voltage is applied to (b) the normal drive, the electric potential difference between the adjacent pixels becomes larger. This causes an increase in the lateral electrical field.

As a result, in a case where the reverse tilt remains, the reverse transition becomes more likely to occur.

(Conventional Driving)

Conventionally, after the transition from the spray orientation state into the bend orientation state is caused by applying a high voltage (a transition voltage) to the common electrode 27, the transition voltage was instantaneously (that is, in an extremely short time) stopped from being applied so that the normal driving was started. As such, it is sometimes the case that both of the condition (1) of remaining of the reverse tilt and the condition (2) of existing of the lateral electrical field at a time when the transition voltage is turned off were not satisfied.

In other words, the reverse transition was likely to occur because the transition instantaneously occurs from "a state (1) where the reverse tilt remains (a period during which the transition voltage is being applied)" into "a state (2) where the lateral electrical field generated is strong (a period during which the normal driving is being carried out)".

(Driving of Present Embodiment)

In contrast to the conventional driving, according to the present embodiment, a voltage is applied so that a condition of occurrence of the reverse transition is not satisfied, i.e., so that the condition that the transition instantaneously occurs from "the state (1) in which the reverse tilt is generated while the reverse transition voltage is being applied into the state (2) where the lateral electrical field is strong" is not satisfied. That is, in order to prevent the reverse transition, the driving is carried out such that at least one of the above-described conditions (1) and (2) is not satisfied.

Specifically, the driving of the present embodiment is carried out so that the condition (1) out of the above-described conditions (1) and (2) is not satisfied.

In other words, as illustrated in "TRANSITION VOLTAGE (PRESENT EMBODIMENT)" of FIG. 5, (1) a voltage of approximately a few volts to tens of volts (for example +25 VDC) is first applied, as a transition voltage, to the common electrode (COM) so as to cause the transition of the entire liquid crystal display panel 5 into the bend orientation state ("first step"), and (2) a voltage applied to the common electrode is then reduced not instantaneously, but continuously ("second step") after the transition of the entire liquid crystal display panel 5 into the bend orientation state ("second step").

The normal inversion driving etc. is started after the voltage applied to the common electrode is reduced to a reverse tilt eliminating voltage.

Here, the reverse tilt eliminating voltage intends to a voltage that causes (i) the liquid crystal molecules, which existed in the edge parts of the respective pixel electrodes and which were tilted in the reverse tilt direction while the transition voltage was being applied, are completely tilted in the forward tilt direction and (ii) no liquid crystal molecule which is tilted in the reverse tilt direction to exist.

The reverse tilt eliminating voltage varies depending on factors such as the type of and physical property of a liquid crystal material, ambient temperature, and/or design (such as a thickness of the liquid crystal layer) of the liquid crystal panel. In view of the factors, the reverse tilt eliminating voltage is typically set to around 15 V. Alternatively, it is set to a voltage equal to or lower than the pixel electrode electric potential.

Further, in the second step, the speed at which the voltage applied to the liquid crystal layer is continuously reduced from the transition voltage to the reverse tilt eliminating voltage is not particularly limited, provided that the speed is equal to or lower than a speed at which the liquid crystal molecules respond.

This is because, in the case where the voltage is reduced at the speed equal to or lower than the speed at which the liquid crystal molecules respond, it is sure to eliminate the state in which the liquid crystal molecules are twisted. This makes it possible to more surely prevent the reverse transition.

The speed at which the liquid crystal molecules respond varies depending on factors such as the type of and/or temperature of the liquid crystal. In view of the factors, it is possible that the speed is 0.04 V/second (25 V is reduced per second), for example.

According to the method of driving the liquid crystal display device in accordance with the present embodiment, the voltage to be applied to the liquid crystal layer is thus controlled in the first step and then in the second step, so that "the transition voltage is continuously reduced and then turned off when it reaches a voltage equal to or lower than the reverse tilt eliminating voltage". This continuously reduces the state in which the liquid crystal molecules 52, in the vicinities of the edge parts of the respective pixel electrodes 17, are tilted in the reverse tilt direction and are twisted. As such, the lateral electrical field is applied in the state no reverse tilt exists. As a result, it is possible to prevent the reverse transition, particularly the reverse transition occurring above the gate bus lines 32 or the like.

It should be noted that the voltage is applied, in the step 1 and the step 2, to the liquid crystal layer via mainly a power supply for driving common electrode 68.

Figure 8:
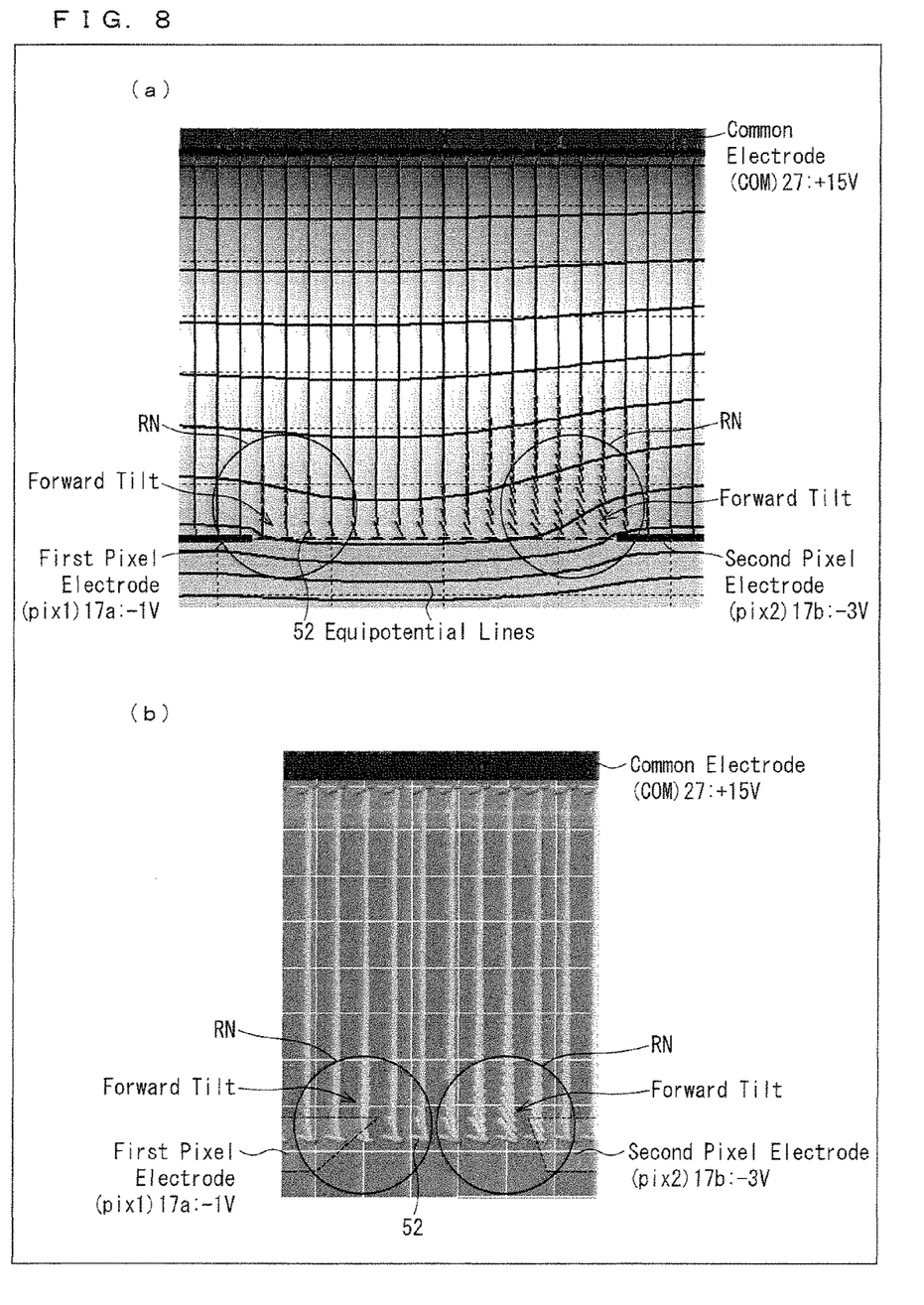
FIG. 8 shows diagrams schematically illustrating an orientation state of liquid crystal molecules while a voltage at which a reverse tilt is eliminated is being applied.

(a) and (b) of FIG. 8 illustrate how liquid crystal molecules orient while a common electrode electric potential of +15 V is being applied. In other words, (a) and (b) of FIG. 8 illustrate the state of the liquid crystal molecules etc. occurred when a voltage is reduced from the transition voltage to the reverse tilt eliminating voltage (15 V). (b) of FIG. 8 is an enlarged view of a part of (a) of FIG. 8.

FIG. 8 shows that, in a case where the common electrode electric potential is +15 V, the liquid crystal molecules 52 were neither greatly twisted nor tilted in the reverse direction unlike the case earlier described with reference to FIG. 4. FIG. 8 also shows that the reverse tilt, occurred while the transition voltage of 25 V was being applied to the common electrode, is reduced and eliminated.

(Summary)

In the method of driving the liquid crystal display device (the method of applying a voltage) in accordance with the present embodiment, after the transition of all the pixels 30 into the bend orientation state by applying the high voltage to the common electrode 27, the voltage is continuously reduced until no reverse tilt exists. Thereafter, the transition voltage is turned off. That is, the reverse transition is prevented by eliminating the reverse tilt that occurs when the transition voltage is turned off.

Here, the reason why the voltage to be applied is continuously reduced is that such continuous reduction causes the twist orientation of the liquid crystal molecules above a gate bus line 32 etc. to be continuously eliminated.

Note that, if the reverse tilt eliminating voltage is lower than 15 V, for example 0 V, then it is possible to more surely prevent the reverse tilt.

Note also that, according to the method of driving the liquid crystal display device in accordance with the present invention, it is possible to secure, at least in the first step, a period during which no electric potential difference occurs between (i) a first pixel electrode and (ii) at least one of a plurality of pixel electrodes that are adjacent to the first pixel electrode.

As such, the bend orientation becomes more likely to spread from a first pixel into pixels adjacent to the first pixel by controlling the electric potential difference between the adjacent pixel electrodes. This allows the spray-bend transition to be quickly carried out over the entire display surface. Note that the control of the electric potential of such pixel electrodes can be carried out mainly via the gate driver 62 and the source driver 64.

The invention is not limited to the description of the embodiments above, but may be altered within the scope of the claims. That is, an embodiment obtained from a proper combination of technical means appropriately modified is also encompassed in the technical scope of the invention provided such modifications do not exceed the scope of the patent claims.

INDUSTRIAL APPLICABILITY

An OCB mode liquid crystal display device of the present invention is suitably applicable to applications that require high-quality moving image display because it is capable of preventing an occurrence of a reverse transition and a reduction in display quality.

The invention claimed is:

1. A method of driving an OCB mode liquid crystal display device,
the OCB mode liquid crystal display device including:
a main substrate on which pixel electrodes are provided;
a counter substrate on which a common electrode is provided; and
a liquid crystal layer sandwiched between the main substrate and the counter substrate,
the liquid crystal layer containing liquid crystal molecules which are in a spray orientation state while no voltage is applied to the liquid crystal layer, and a transition of the liquid crystal molecules occurring from the spray orientation state into a bend orientation state in response to a voltage applied to the liquid crystal layer,
said method comprising the steps of:
(i) applying, to the liquid crystal layer, a transition voltage causing the transition of the liquid crystal molecules into the bend orientation state; and
(ii) continuously reducing the voltage to be applied to the liquid crystal layer from the transition voltage to a reverse tilt eliminating voltage, the reverse tilt eliminating voltage causing the liquid crystal molecules, which exist in an edge part of each of the pixel electrodes and which are tilted in a reverse tilt direction while the transition voltage is being applied, to be tilted in a forward tilt direction, the forward tilt direction being a direction in which the liquid crystal molecules are tilted while no voltage is applied, and the reverse tilt direction being a direction reverse to the forward tilt direction.

2. The method according to claim 1, wherein:
the pixel electrodes are provided in a lattice pattern on the main substrate,
a switching element is provided for each of the pixel electrodes,
the switching element is a transistor element,
a plurality of gate bus lines and a plurality of source bus lines are provided on the main substrate so as to intersect with each other,
the transistor element is connected to at least one of the plurality of gate bus lines and to at least one of the plurality of source bus lines,
at least one of the plurality of the gate bus lines or at least one of the plurality of the source bus lines is provided between adjacent ones of the pixel electrodes, and
the pixel electrodes that are provided in the lattice pattern are inversely driven.

3. The method according to claim 1, wherein the voltage to be applied to the liquid crystal layer is continuously reduced, at a speed equal to or lower than a speed at which the liquid crystal molecules respond, from the transition voltage to the reverse tilt eliminating voltage.

4. The method according to claim 2, wherein:
in at least the step (i), a period is secured during which no electric potential difference occurs between adjacent ones of the pixel electrodes between which a corresponding one of the plurality of gate bus lines is provided by simultaneously causing all of the plurality of gate bus lines to be in an ON state so that voltages of identical polarity are applied to the respective adjacent ones of the pixel electrodes.

5. The method according to claim 1, wherein the reverse tilt eliminating voltage is 0 V or higher and 15 V or lower.

6. The method according to claim 1, wherein the reverse tilt eliminating voltage is not higher than a pixel electrode electric potential.

7. A liquid crystal display device driven by a method recited in claim 1.

* * * * *